US009277018B2

(12) United States Patent
Kotecha et al.

(10) Patent No.: US 9,277,018 B2
(45) Date of Patent: Mar. 1, 2016

(54) MOBILE DEVICE DETECTION OF WIRELESS BEACONS AND AUTOMATIC PERFORMANCE OF ACTIONS

(71) Applicant: Verizon Patent and Licensing Inc., Arlington, VA (US)

(72) Inventors: Lalit R. Kotecha, San Ramon, CA (US); Kent W. Hughes, Oakland, CA (US); Kumar Sanjeev, San Ramon, CA (US); Mingxing S. Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/302,008

(22) Filed: Jun. 11, 2014

(65) Prior Publication Data

US 2015/0365486 A1 Dec. 17, 2015

(51) Int. Cl.
*H04M 3/42* (2006.01)
*H04L 29/08* (2006.01)
*H04W 4/00* (2009.01)

(52) U.S. Cl.
CPC ............... *H04L 67/18* (2013.01); *H04L 67/20* (2013.01); *H04W 4/008* (2013.01)

(58) Field of Classification Search
CPC .................. H04L 29/08108; H04L 29/08072; H04W 8/245; H04M 1/72519
USPC ............ 455/414.1, 418, 550.1, 41.2; 709/203
See application file for complete search history.

(56) References Cited

U.S. PATENT DOCUMENTS

| | | | | |
|---|---|---|---|---|
| 7,382,244 | B1 * | 6/2008 | Donovan | G08B 13/19645 340/506 |
| 2004/0002843 | A1 * | 1/2004 | Robarts | A63F 13/10 703/13 |
| 2009/0005987 | A1 * | 1/2009 | Vengroff | G06Q 30/02 701/300 |
| 2009/0271529 | A1 * | 10/2009 | Kashiyama | G06F 17/30477 710/1 |
| 2010/0321183 | A1 * | 12/2010 | Donovan | G08B 13/19645 340/540 |
| 2011/0055381 | A1 * | 3/2011 | Narasimhan | H04L 41/046 709/224 |
| 2011/0225417 | A1 * | 9/2011 | Maharajh | G06F 21/10 713/150 |
| 2012/0040743 | A1 * | 2/2012 | Auterio | A63F 13/12 463/25 |
| 2013/0079037 | A1 * | 3/2013 | Dobyns | H04W 4/008 455/456.3 |
| 2013/0167196 | A1 * | 6/2013 | Spencer | H04W 8/22 726/3 |
| 2014/0135588 | A1 * | 5/2014 | Al-Ali | G06F 19/327 600/300 |
| 2014/0156833 | A1 * | 6/2014 | Robinson | H04L 43/0817 709/224 |

OTHER PUBLICATIONS

J. Cox, "Apple's iBeacon Turns Location Sensing Inside Out," Network World, Feb. 10, 2014 (available at http://www.networkworld.com/news/2014-021014-apple-ibeacon-278571.html, visited May 28, 2014).

Multiple, "iBeacon," Wikipdia, Aug. 1998 (available at http://www.en.wikipedia.org/wiki/index.php?oldid=610460041, visited May 28, 2014).

\* cited by examiner

*Primary Examiner* — Danh Le (57) ABSTRACT

A mobile device may perform actions based on sensing a wireless beacons. The action to take, for a particular beacon, may be determined based on a query to a remote database or server. For example, in one implementation, a method may include detecting a wireless beacon that is in proximity to the mobile device; querying, based on the beacon identifier, a remote computing device for attribute information relating to the wireless beacon; and determining, based on the received attribute information, one or more actions to perform by the mobile device.

20 Claims, 10 Drawing Sheets

| Beacon ID (410) | Associated App(s) (420) | Actions (430) | Location (440) | Owner (450) | Security (460) |
|---|---|---|---|---|---|
| 550e8400-e29b-41d4 | <XYZ Product Info> | none | 38.7801, -77.3866 | XYZ | <digital signature> |
| 572e4400-e29b-81d4 | none | <play audible alert> | 39.0438, -77.4874 | none | none |
| ⋮ | ⋮ | ⋮ | ⋮ | | |

MOBILE DEVICE DETECTION OF WIRELESS BEACONS AND AUTOMATIC PERFORMANCE OF ACTIONS

BACKGROUND

Wireless beacons include devices that broadcast information, such as a unique identifier associated with a beacon, to nearby mobile devices. The primary role of a beacon may be to advertise the existence of the beacon to the nearby mobile devices. A beacon may be implemented as a relatively small and inexpensive electronic device that is based on a short range wireless standard, such as a beacon based on the Bluetooth Low Energy (BLE) standard.

One known use of beacons is to provide one or more beacons in a facility (a store, office, convention center, etc.). A mobile device of a user that is traveling through the facility may detect when the mobile device is in proximity to the beacons. The mobile device can use the identities of the beacons to assist in navigating the facility and/or receiving information about the facility.

DETAILED DESCRIPTION OF PREFERRED EMBODIMENTS

The following detailed description refers to the accompanying drawings. The same reference numbers in different drawings may identify the same or similar elements.

Techniques described herein may relate to mobile devices that may sense proximity to wireless beacons. The mobile devices may perform actions based on sensing the wireless beacons. The action to take, for a particular beacon, may be determined based on a query to a remote database or server. Entities responsible for the placement of the beacons may update the database to indicate attributes, such as various actions, associated with the beacons. For example, some beacons may be associated with particular applications (e.g., a web browser and a particular link, a custom application associated with a manufacturer of a product), some beacons may be associated with messages that may be provided to the user (e.g., in a notification area of a mobile device), and other beacons may be associated with other actions. The remote database, or server, may be implemented by a telecommunications provider that provides network services to the mobile devices.

Figure 1A:
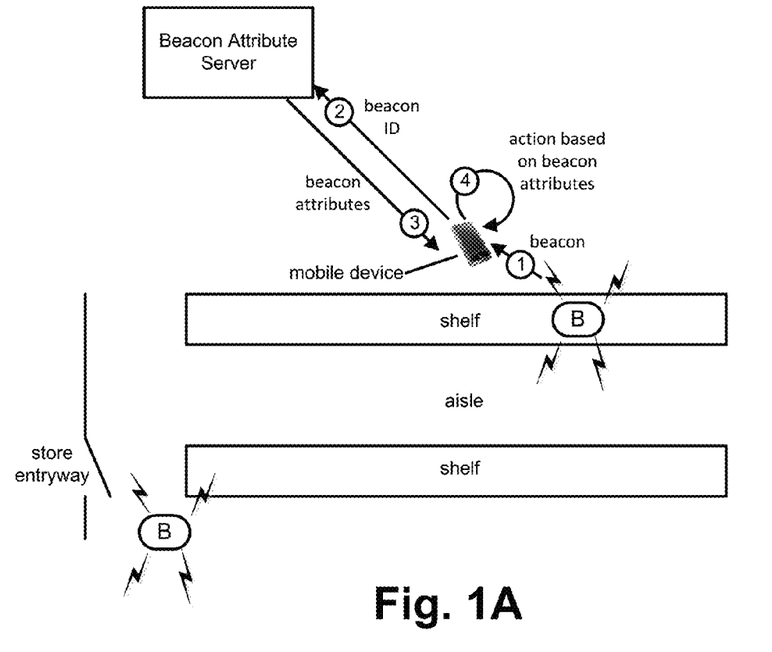
FIGS. 1A, 1B, and 1C are diagrams illustrating examples of overviews of concepts described herein.
Figure 1B:
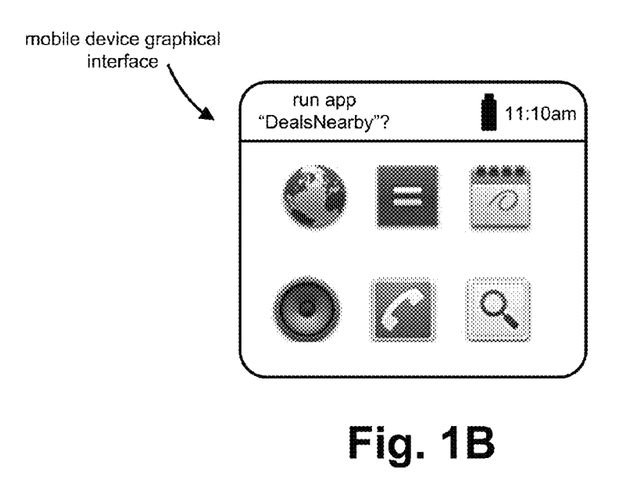
Figure 1C:
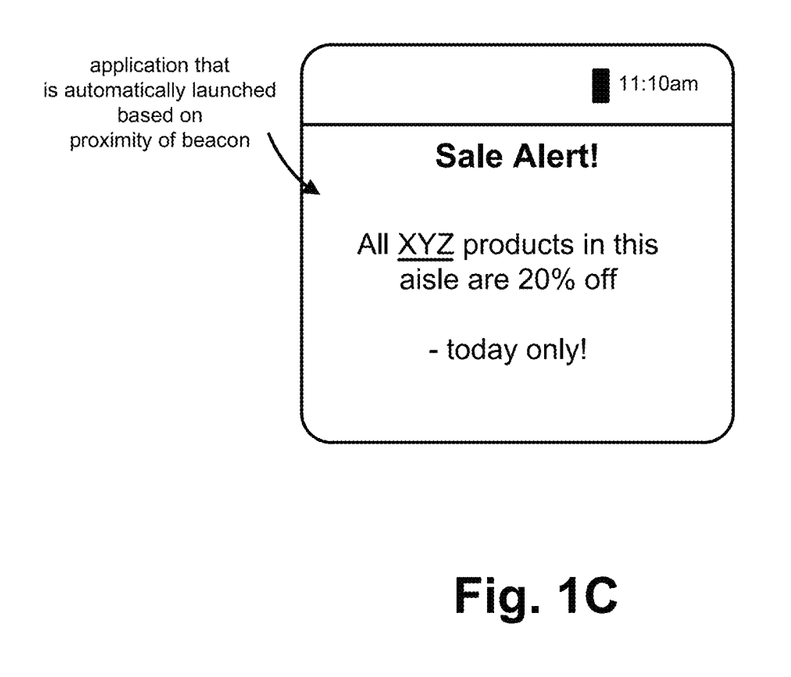

FIGS. 1A, 1B, and 1C are diagrams illustrating examples of overviews of concepts described herein. As illustrated in FIG. 1A, assume a mobile device (e.g., being carried by a user) is in a retail store that has a number of aisles and shelves that contain products for sale. Beacons (labeled as "B") may be placed at various locations in the retail store. For example, a first beacon may be placed, by the store owners and on behalf of a first company, on a shelf near products of the first company. A second beacon may be placed, by the store owners, near an entryway of the store. When the mobile device comes into proximity of the first beacon (e.g., within approximately three meters of the first beacon), the mobile device may provide information, to the user of the mobile device, relating to the products of the first company. When the mobile device comes into proximity of the second beacon, the mobile device may provide information providing the user with an "introduction" to the store and/or providing information relating to current sales being offered by the store. By placing beacons, potentially having different functions, around the store, the user's shopping experience may potentially be enhanced.

The action(s) to take, for any particular beacon, may be stored by a remote server (or database or other computing device), illustrated as beacon attribute server in FIG. 1A. More generally, the beacon attribute server may store attributes associated with beacons. The attributes may indicate applications to execute or download, links or other external information sources that are associated with particular beacons, security information associated with particular beacons, particular companies or other sponsors/owners that are associated with particular beacons, beacon locations, and/or other information associated with beacons. In some implementations, the beacon attribute server may also maintain permissions that have been granted by various users (of mobile devices) for particular beacons. For example, the beacon attribute server may store an indication that a particular user is interested in being notified when the user is in proximity to beacons maintained by a particular set of companies but are not interested in being notified when the user is in proximity to beacons maintained by other companies.

As particularly illustrated in FIG. 1A, assume that a mobile device detects a beacon (arrow 1, "beacon"). The beacon, such as a BLE beacon, may periodically emit a beacon signal. The mobile device may detect the beacon signal when, for example, mobile device enters within a certain range of the beacon (e.g., a few meters). The beacon signal may include an identifier, such as a universally unique identifier (UUID) associated with the beacon. The mobile device may query the beacon attribute server based on the beacon identifier (arrow 2, "beacon ID"). The beacon attribute server may use the beacon identifier to determine attributes associated with the beacon and may respond to the query with the attributes (arrow 3, "beacon attributes"). The mobile device may take one or more actions based on the beacon attributes (arrow 4, "action based on beacon attributes").

As previously mentioned, the beacon attributes may indicate a number of possible actions, such as links or other external information sources that are associated with the beacon, applications to execute, or other actions. Two examples of actions are illustrated in FIGS. 1B and 1C, respectively. As shown in FIG. 1B, a graphical interface of the mobile device (e.g., when the mobile device is a smart phone) may display, in response to detection of a particular beacon, a message in a notification area of the graphical interface (e.g., the message "run app 'DealsNearby?'"). The message may be accompanied by a sound or vibration that serves to notify the user that the user is near a beacon. The user may, for example, select the notification to launch an application that provides additional information about products, near the beacon, that are on sale.

In the implementation shown in FIG. 1C, in response to detection of a particular beacon, an application may automatically be launched by the mobile device. For example, the beacon attributes may specify the application that the mobile device is to launch. In the example of FIG. 1C, an application is launched that indicates that certain nearby products are on sale. A user may, for example, select, via the application, a link associated with the products to obtain additional information about the products. As the user moves around the store, identification of additional beacons may be used to update the displayed sale items.

Figure 2:
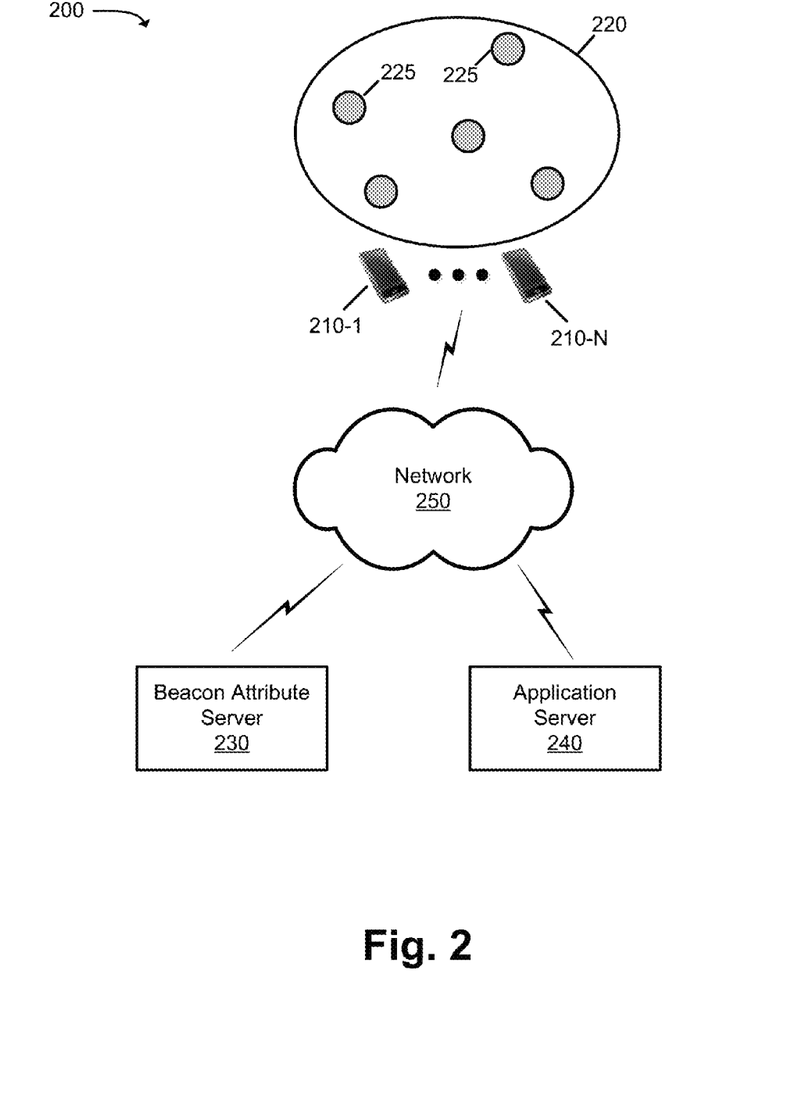
FIG. 2 is a diagram of an example environment in which systems and/or methods described herein may be implemented.

FIG. 2 is a diagram of an example environment 200, in which systems and/or methods described herein may be implemented. As shown in FIG. 2, environment 200 includes mobile devices 210-1 through 210-N (where N is an integer greater than or equal to one, hereinafter sometimes referred to individually as "mobile device 210" and collectively as "mobile devices 210"), facility 220, beacon attribute server 230, application server 240, and network 250. Facility 220 may include one or more beacons 225.

Mobile devices 210 may each include a computing and communication device capable of communicating via a network, such as network 250. For example, mobile device 210 may correspond to a mobile communication device (e.g., a smart phone or a personal digital assistant (PDA)), a portable computer device (e.g., a laptop or a tablet computer), a gaming device, or another type of computing and/or communication device. Mobile device 210 may include logic and/or hardware to receive wireless communications corresponding to beacon signals that are broadcast by beacons 225. For example, mobile device 210 may be compatible with BLE-based beacons. Mobile device 210 may include, at the operating system or middleware layer, the ability to recognize and/or use GPS or other techniques to determine the current location of mobile device 210. Mobile device 210 may also include the ability to communicate via direct short range wireless connections, such as via Wi-Fi, Bluetooth, Near-Field Communication (NFC), etc.

Facility 220 may include a building, residence, stadium, park, or other location in which beacons 225 have been installed. Beacons 225 may be installed to provide information to users, via mobile devices 210, in facility 220. As previously mentioned, beacons 225 may include relatively inexpensive wireless transmitters the broadcast an indication of the existence of beacons 225. In one implementation, each beacon may periodically (e.g., once a second or multiple times a second) broadcast an identifier, such as a UUID, associated with beacon 225. Beacons 225 may include BLE-based beacons that may be capable of operating on battery power for multiple months. A mobile device 210 that receives a broadcast from a beacon 225 may be capable of distinguishing the distance between mobile device 210 and beacon 225 to a number of distinct ranges, such as: immediate (within a few centimeters), near (within a couple of meters), and far (greater than the near range). In some implementations, technologies other than BLE may be used. For example, beacons 225 may be based on communications via Wi-Fi, Wi-Fi Direct, NFC, and/or other short range wireless technologies.

Beacon attribute server 230 may include one or more computing devices, such as a server device, a collection of server devices (which may potentially be geographically distributed), or other computing devices. In some implementations, beacon attribute server 230 may include or be a database. Beacon attribute server 230 may generally provide a centralized location, that may be queried by mobile devices 210, to obtain information relating to various beacons 225. In this manner, a mobile device 210 that is in proximity to a beacon 225 may use the identifier associated with the beacon to query beacon attribute server 230. Beacon attribute server 230 may respond to mobile device 210 by transmitting one or more attributes relating to the beacon. As previously mentioned, the attributes may define applications, links, or other information associated with beacons.

In some implementations, beacon attribute server 230 may provide an interface through which owners of beacons 225 may interact to modify attributes associated with the beacons associated with the owner. Additionally, in some implementations, beacon attribute server 230 may provide an interface through which users (e.g., users of mobile devices 210) may interact to indicate particular beacons and/or particular classes of beacons (e.g., all beacons associated with a particular company) that should be recognized by the users' mobile devices 210.

Application server 240 may include one or more computing devices, such as a server device, a collection of server devices (which may potentially be geographically distributed), or other computing devices. Application server 240 provide services to applications, such as applications installed at mobile devices 210. The applications may include applications that are launched, by mobile devices 210, in response to detection of a nearby beacon 225 and/or applications that interact with the user based on which beacons are determined to be nearby the user. For example, a particular company that manufactures products may distribute a mobile device application that interacts with application server 240 to obtain sales and product information relating to the products. As another example, an application may provide a "guided" tour of a museum by providing textual, audio, and/or visual content whenever a user enters the proximity of particular exhibits. The application may receive the relevant content from application server 240.

In one implementation, interactions with beacon attribute server 230 and application server 240 may be made via wide area networks. For example, mobile device 210 may communicate with beacon attribute server 230 and application server 240 using a long-term evolution (LTE) network.

Network 250 may include one or more wired and/or wireless networks. For example, network 250 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
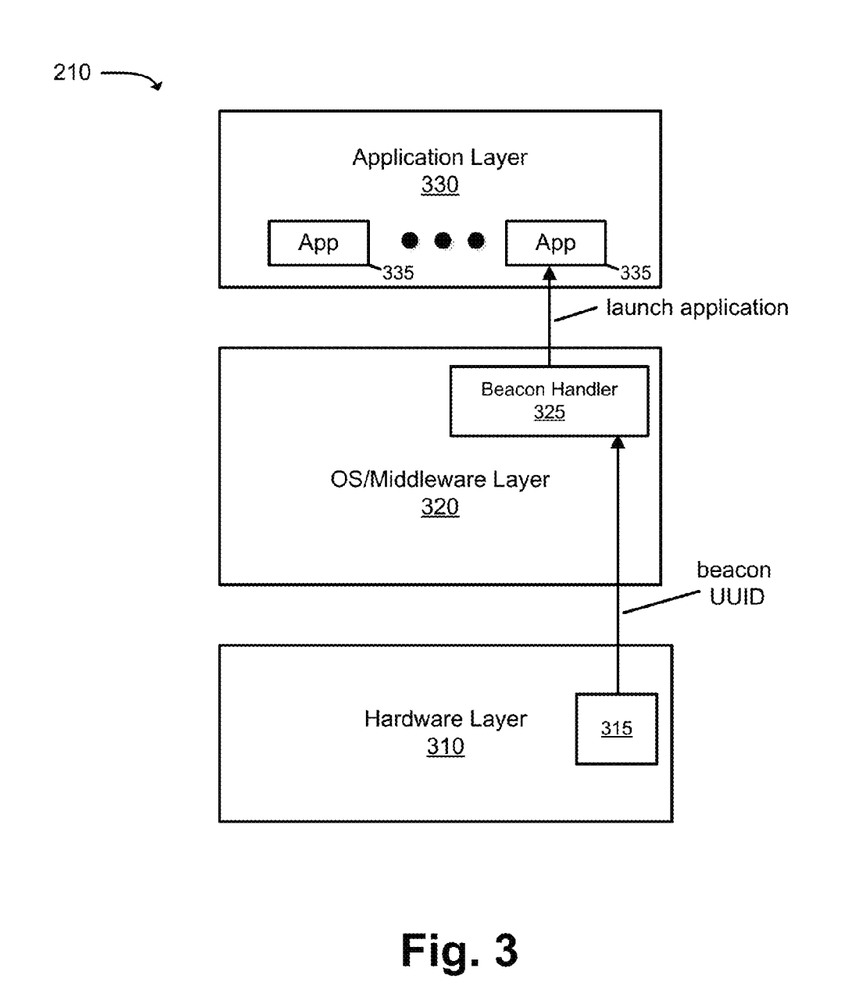
FIG. 3 is a block diagram conceptually illustrating functional components of a mobile device that may aid in the detecting and acting on broadcasts of beacons.

FIG. 3 is a block diagram conceptually illustrating functional components of a mobile device that may aid in the detecting and acting on broadcasts of beacons. As illustrated, mobile device 210 may include hardware layer 310, operating system (OS)/middleware layer 320, and application layer 330.

Hardware layer 310 may include electronic hardware (e.g., logic circuits, processors, and memory) implement by mobile device 210. Hardware layer 310 may include, for example, radio transceiver circuits (e.g., for cellular wireless connections and short range wireless connections), antennas, processors, displays, input devices, and/or other hardware elements. One example of functional components that may be included in hardware layer 310 is illustrated below with respect to FIG. 9.

Hardware layer 310 may receive broadcasts from beacons 225 via beacon detection component 315. Beacon detection component 315 may include, for example, BLE circuitry to receive BLE beacon transmissions. As previously mentioned, a broadcast from a beacon 225 may include an identifier that is unique to the particular beacon (e.g., a UUID for the beacon). An example of a beacon broadcast is illustrated in FIG. 3 as "beacon UUID."

OS/middleware layer 320 may include logic to manage resources of device 210 and provide services for application programs. OS/middleware layer 320 may include beacon handler 325. Beacon handler 325 may process UUIDs that are received from beacons 225. Beacon handler 325 may, for instance, determine whether the received beacon UUID is a newly encountered beacon (e.g., a beacon UUID that has not been previously detected by mobile device 210 or not detected within a particular threshold period) and, in response to the determination that the beacon is a newly encountered beacon, determine an appropriate action to take with respect to the beacon. For example, beacon handler 325 may query beacon attribute server 230, based on the UUID, to determine attributes associated with the beacon. Beacon handler 325 may subsequently implement the action(s) indicated by the attributes.

Application layer 330 may include one or more user applications 335. Applications may be controlled by and use services provided by OS/middleware layer 320. A particular application 335 may, for example, be launched by beacon handler 325. An executing application may receive an indication whenever mobile device 210 comes into range of a beacon or comes into range of a beacon associated with the application.

Figure 4:
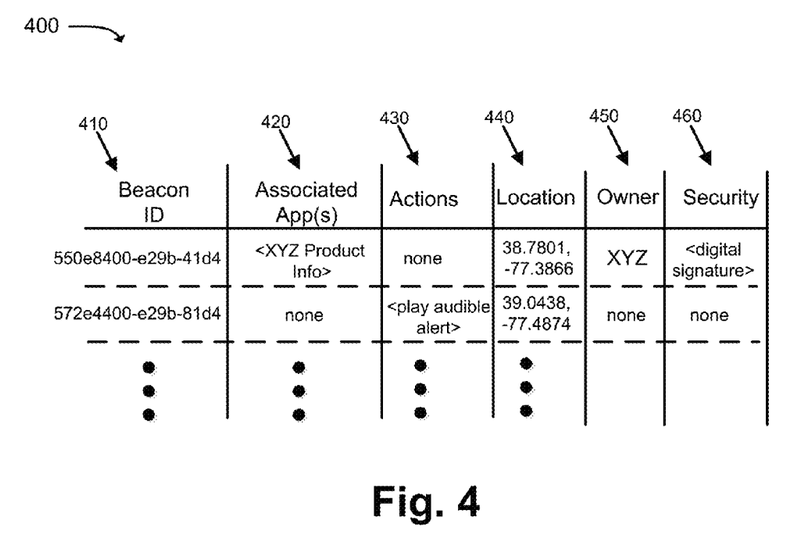
FIG. 4 is a diagram illustrating an example data structure which may be stored by a beacon attribute server.

FIG. 4 is a diagram illustrating an example data structure 400, which may be stored by beacon attribute server 230. The fields shown for data structure 400 are examples. In practice, data structure 400 may include fewer, additional, or different fields. In one implementation, each entry in data structure 400 may correspond to a beacon.

Data structure 400 may include beacon identifier (ID) field 410, associated application(s) (app(s)) field 420, actions field 430, location field 440, owner field 450, and security field 460. Beacon identifier (ID) field 410 may store a value that identifies a particular beacon. As previously mentioned, a beacon's identifier may include a value that uniquely identifies a particular beacon, such as a UUID. The value for beacon identifier field 310 may be the value broadcast by beacon 225, and/or may be derived from the broadcasted value (e.g., the first 10 characters, etc.). Associated application(s) field 420 may include values identifying one or more applications 335 associated with a particular beacon 225. Actions field 430 may include information identifying one or more actions that are associated with a particular beacon 225. In some implementations, associated application(s) field 420 and actions field 430 may be combined and implemented as a single entry in data structure 400. For example, an action associated with actions field 430 may include "launch application X," "navigate the default web browser to a particular link," "provide an audible or visible alert to a user," "contact a particular application server that may send text messages," or other actions.

Location field 440 may indicate a location of the particular beacon. The location may be stored as, for example, a latitude/longitude coordinate pair, a postal address, a relative offset within the building (e.g., "first floor, 50 feet North of entry"),etc. The value for location field 440 may be managed by the entity associated with the particular beacon. Owner field 450 may indicate the entity that owns, operates, or otherwise controls the beacon associated with an entry. For example, owner field 450 may indicate the name of a company that installed the beacon, the name of a facility at which the beacon resides, or another value. Security field 460 may include one or more values relating to security and/or authentication information relating to the beacon. For example, security field 460 may include a digital signature corresponding to the entity associated with owner field 450. Via security field 460, mobile device 210 may be able to verify that a particular beacon is in fact associated with the owner of the beacon that is received as part of information from beacon attribute server 230.

Two example entries are illustrated for data structure 400. The first entry may be associated with a beacon having the identifier " 550e8400-e29b-41d4 " (field 410) and the application "XYZ Product Info" (field 420). As indicated, there may be no additional actions associated with this beacon (field 420). The beacon may be located at the latitude and longitude coordinates "38.7801, -77.3866" (field 440) and may be owned by or otherwise associated with the company "XYZ" (field 450). The company XYZ may have included a digital signature in data structure 400 (field 460) to allow authentication company XYZ as the owner of the beacon. The second entry, in data structure 400, may be associated with a second beacon having the identifier "572e4400-e29b-81d4" (field 410). As indicated, there may be no applications associated with this beacon but there may be an associated action "play audible alert" (field 430). The beacon may be located at the latitude and longitude coordinates "39.0438, -77.4874" (field 440). Owner field 450 and security field 460 may be omitted for this beacon.

Figure 5:
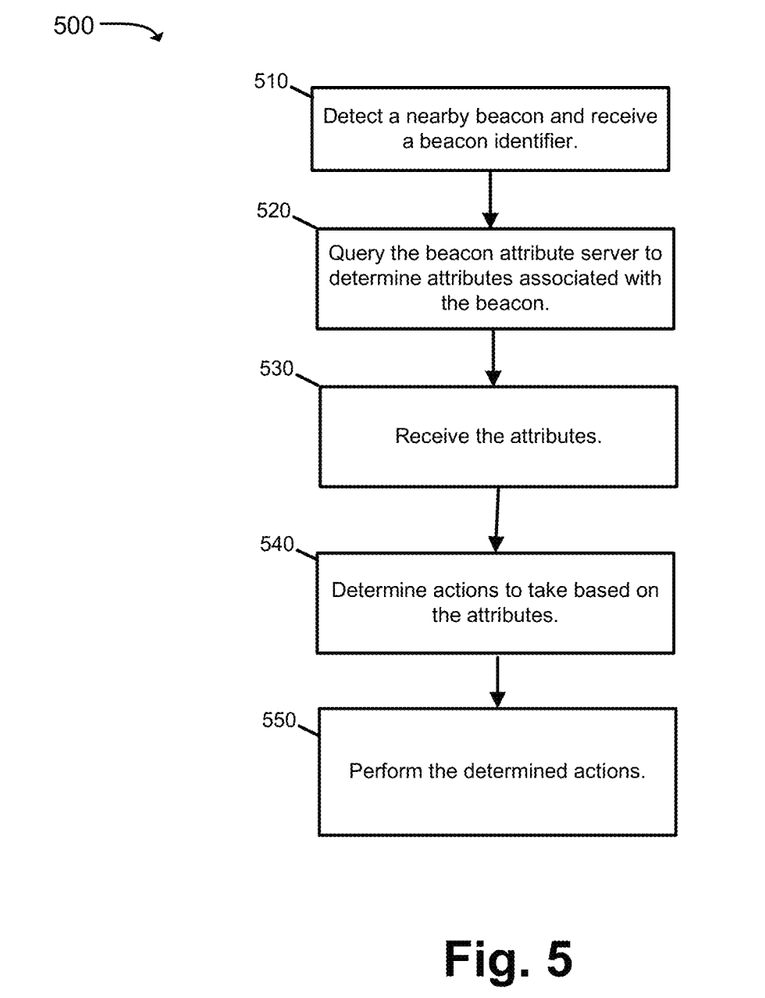
FIG. 5 is a flowchart illustrating an example of a process relating to detection of beacons by a mobile device.

FIG. 5 is a flowchart illustrating an example of a process 500 relating to detection of beacons by a mobile device. Process 500 may be performed by, for example, mobile device 210.

Process 500 may include detecting a nearby beacon and receiving a corresponding beacon identifier (at 510). As previously mentioned, beacon 225 may broadcast beacon signals that include an identifier associated with beacon 225. Mobile device 210 may receive the beacon signals and may determine the identifier. In some implementations, mobile device 210 may also be able to determine an approximate distance from beacon 225, such as a determination that beacon 225 is immediate (within a few centimeters), near (within a couple of meters), or far (greater than the near range). In one implementation, detection of a nearby beacon 225 and receiving the corresponding beacon identifier may be performed by hardware layer 310 and/or OS/middleware layer 320 of mobile device 210.

Process 500 may further include querying the beacon attribute server to determine attributes associated with the beacon (block 520). As previously mentioned, beacon attribute server 230 may be a server, database, or other remote application that may act as a repository that initiates beacon identifiers to attributes. Querying beacon attribute server 230 may be performed by OS/middleware layer 320 of mobile device 210, such as by beacon handler 325, and the query may be made over network 250 (e.g., over a cellular wireless network or other type of WAN). In some implementations, beacon attribute server 230 may only be queried when the detected beacon 225 is detected for the first time or has not been detected recently (e.g., within a threshold period of time). Attributes for a beacon that were recently detected may be cached and used instead of querying beacon attribute server 230.

Process 500 may further include receiving the attributes, associated with the beacon, in response to the query (block 530). As previously mentioned, the attributes for beacon 225 may relate to applications that are to be executed or launched, other actions associated with beacon 225, and/or security/authentication information associated with beacon 220.

Process 500 may further include determining actions to take based on the attributes (block 540). The actions to take may be specified in, for example, applications field 420 and/or actions field 430 (FIG. 4). In some implementations, before performing any actions based on the detection of a beacon, mobile device 210 may first authenticate and/or verify the beacon. For example, the attributes may include security information (e.g., as specified in field 460), such as a digital cryptographic signature. In this case, mobile device 210 may receive the digital cryptographic signature and very that the attributes corresponding to the beacon were signed by the actual owner of the beacon. As another example, security field 460 may include permissions relating to the beacon (e.g., the application associated with the beacon may only be used by certain parties), security policies relating to the beacon (e.g., certain criteria that should be met before the application associated with the beacon may only be used), or other information.

In one implementation, the determination of the actions to take based on the attributes may further include applying user preference filters to the determined actions. A user of mobile device 210 may, for instance, specify certain types of actions that are allowed to be executed by mobile device 210, certain beacon owners that are allowed or trusted, certain beacon owners that are allowed or trusted but only after obtaining explicit permission from the user, certain beacon owners that are always rejected, etc.

Process 500 may further include performing the determined actions (block 550). For instance, a particular application, identified in the attribute data received from beacon attribute server 230, may be executed by beacon handler 325. When launching an application, mobile device 210 may emit a sound or vibrate to alert a user of the mobile device of the launching of the application. As another example, the attributes may specify that a particular link may be opened. In this case, a browser program, such as a default browser program for mobile device 210, may be opened at the particular link. As previously mentioned, the determined actions may include other actions, such as playing a sound, outputting a message such as a notification, or performing other actions.

Figure 6:
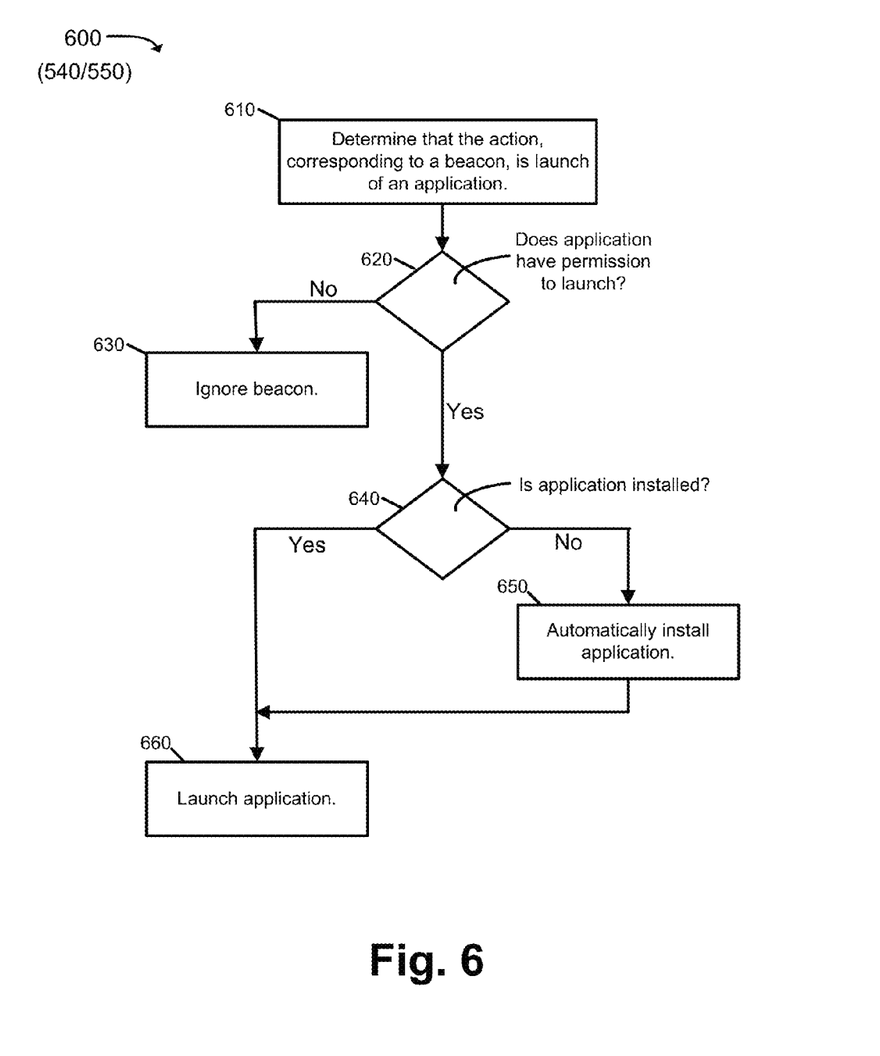
FIG. 6 is a flowchart illustrating an example of a process relating to determining actions to take based on attributes of a beacon and performing the determined actions.

FIG. 6 is a flowchart illustrating an example of a process 600 relating to determining actions to take based on attributes of a beacon and performing the determined actions. Process 600 may include one possible implementation of blocks 540 and 550 (FIG. 5) in which the action to take includes launching an application. Process 600 may be performed by, for example, mobile device 210.

Process 600 may include determining that the action, corresponding to a beacon, is a launch of an application (block 610). As mentioned, the query of beacon attribute server 230, for a particular beacon identifier, may return attributes that indicate an application that is associated with the beacon.

Process 600 may further include determining whether the application has permission to launch (block 620). A user of mobile device 210 (or some other entity) may indicate certain applications that are allowed to be automatically launched in response to detected beacons and/or may indicate that applications associated with beacons of certain owners (e.g., certain companies the user is interested in or trusts) may be automatically launched. In some situations, mobile device 210 may determine whether a particular application has permission to be automatically launched based on information in security field 460. For example, mobile device 210 may verify that a digital cryptographic signature, associated with security field 460, is valid before permitting an application to automatically launch.

When the application is determined to not have permission to launch, process 600 may include ignoring the corresponding beacon (block 620—No; block 630). From the user's perspective, the beacon may not have affected the operation of mobile device 210.

When the application is determined to have permission to launch (block 620—Yes), process 600 may include determining whether the application is installed (block 640). When the application is not installed (block 640—No), the application may be automatically installed (block 650). Installation of the application may include, for example, downloading of the application, such as from application server 240, and installing the application on mobile device 210. In some implementations, the installation of the application may not be fully automatic. For example, a notification may be generated to ask the user to verify installation of the application.

Process 600 may further include, after installation of the application or when the application does not need to be installed, launching of the application (block 660). Launching the application may include executing the application. When launching the application, the beacon identifier may be provided to the application. The application may interact with application server 240, such as based on using the beacon identifier, as part of the operation of the application. For example, an application designed to provide additional information about products of a particular company may use the beacon identifier (and/or the location of the beacon) to obtain, from application server 240, a list of products that are in the vicinity of mobile device 210. The application may also obtain, from application server 240, information, such as product literature, relating to the products that are in the vicinity of mobile device 210. The product literature may be presented to the user.

Figure 7:
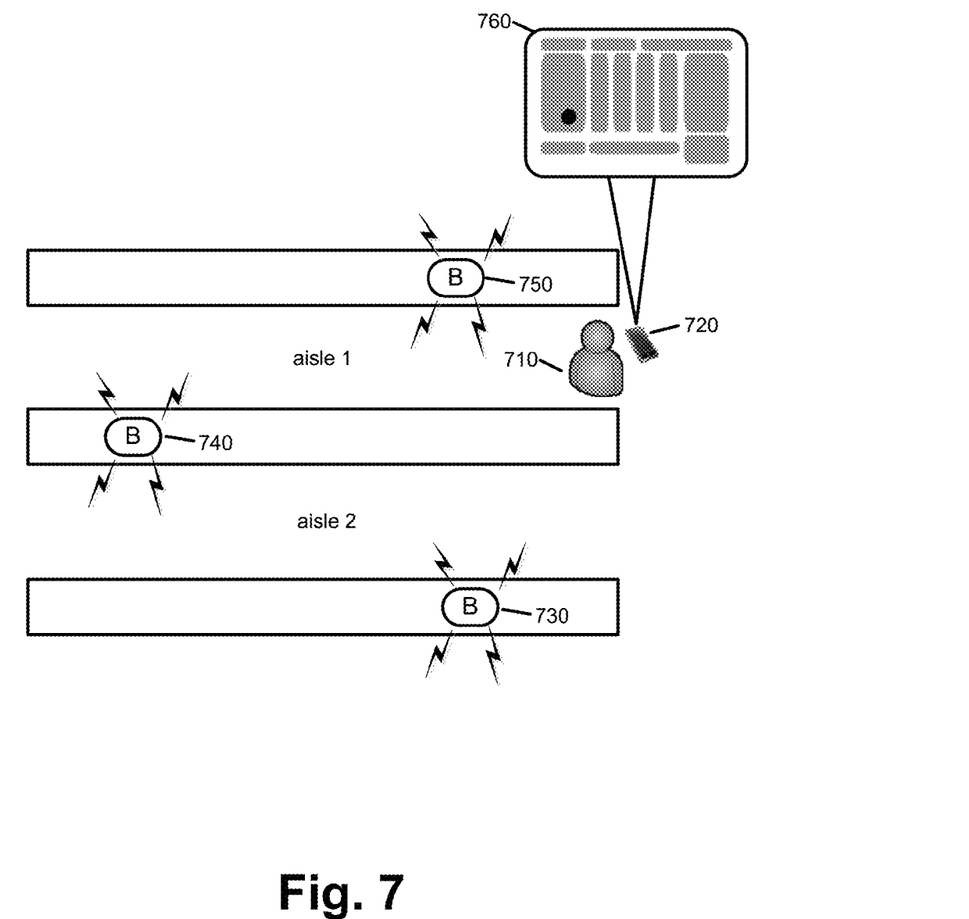
FIG. 7 is a diagram illustrating an example of the use of beacons consistent with aspects described herein.

FIG. 7 is a diagram illustrating an example of the use of beacons consistent with aspects described herein. In the example of FIG. 7, assume that a user 710 (associated with a mobile device 720) is in a store with a number of beacons 730, 740, and 750. Each of beacons 730-750 may be placed in a particular location within the store, such as in a particular aisle of the store. Beacons 730-750 may be placed by an owner of the store to assist users in navigating the aisles of the store.

Assume that user 710 walks down a first aisle of the store and comes into proximity of beacon 750. Mobile device 720 may detect the identifier that is broadcast by beacon 750. In response, mobile device 720 may query beacon attribute server 230 for attributes relating to beacon 750. In this situation, assume that the returned attributes indicate that beacon 750 is associated with an application that is not currently installed on mobile device 210. Further, assume that the security-related attributes that are received from beacon attribute server 230, along with any relevant user preference information entered by user 710, indicate that mobile device 720 may automatically install the application. Mobile device 720 may download the application, such as from application server 240, and the application may be launched. The application may include an application that is custom-designed by the store to provide a map 760 of the store. Map 760 may be provided by the application on a display of mobile device 720.

As the user moves throughout the store, mobile device 710 may detect additional nearby beacons, such as beacon 730 and 740. Beacons 730 and 740 may provide similar functionality as beacon 750. In this case, however, because the application is already installed and executing, the application may not be re-downloaded or re-launched. Detection of these beacons as being in proximity to mobile device 720 may thus not result in the launching of an application. However, as the user comes into proximity of beacons 730 and 740, the application may use the location associated with each of beacons 730 and 740 to update the location of user 710 in a displayed map of the store. For example, beacon handler 325, of OS/middleware layer 320, may, for each detected beacon, query beacon attribute server 230 to obtain the attributes for the beacon, including the beacon's location, which may be forwarded to the application.

Figure 8:
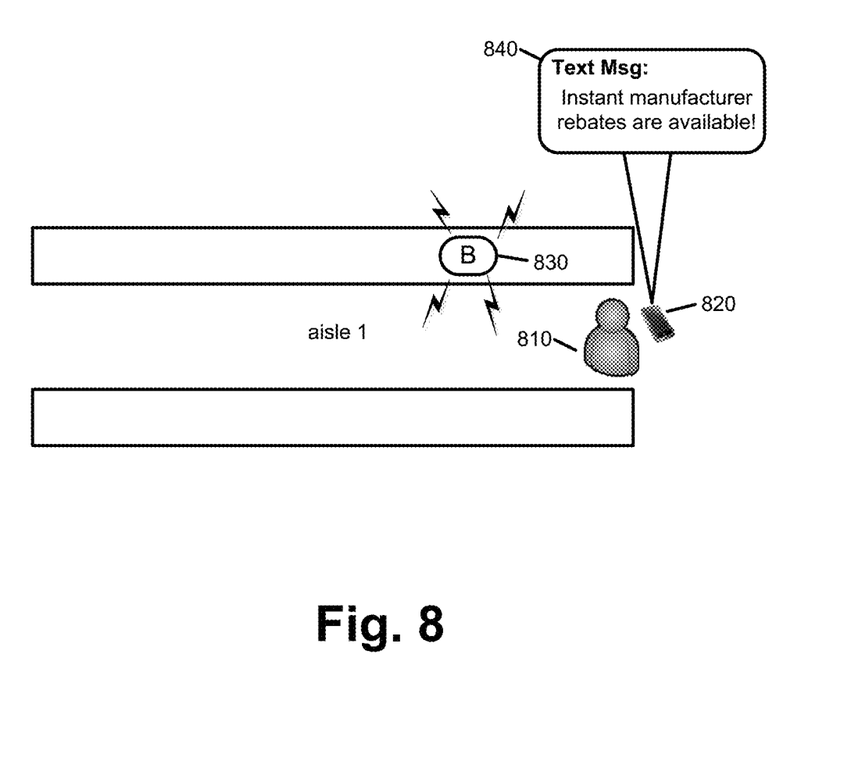
FIG. 8 is a diagram illustrating a second example of the use of beacons consistent with aspects described herein.

FIG. 8 is a diagram illustrating a second example of the use of beacons consistent with aspects described herein. In the example of FIG. 8, assume that a user 810 (associated with a mobile device 820) is in a store with a beacon 830. Beacon 830 may include a beacon associated with a manufacturer, such as a manufacturer that sells products at the store. The beacon may be installed near the products of the particular manufacturer. Beacon 830 may provide customers with information, such as ongoing sales or manufacturer rebates, associated with the products of the manufacturer.

Assume that user 810 walks down a first aisle of the store and comes into proximity of beacon 830. Mobile device 820 may detect the identifier that is broadcast by beacon 830. In response, mobile device 820 may query beacon attribute server 230 for attributes relating to beacon 830. In this situation, assume that the returned attributes indicate that beacon 830 is associated with an application that is not currently installed on mobile device 210 and that beacon 830 is associated with one or more messages, such as text messages, that may be transmitted to mobile device 820. In this case, however, previously entered user preference information may indicate that the user does not wish applications, associated with the particular manufacturer, to be downloaded and/or launched. Accordingly, mobile device 820 may ignore the indication, in the beacon attributes, relating to the application.

Further assume that the previously entered user preference information may indicate that the user has approved the reception of text messages from beacons associated with the particular manufacturer. In this case, based on the beacon attributes, mobile device 820 (e.g., beacon handler 325 of mobile device 820), may contact application server 240 (e.g., an application server associated with the manufacturer), to indicate that mobile device 820 is in proximity of beacon 830. Application server 240 may respond by transmitting one or more text messages 840 to mobile device 820. The text messages may include, for example, information relating to sales or rebates for the products near user 810.

Figure 9:
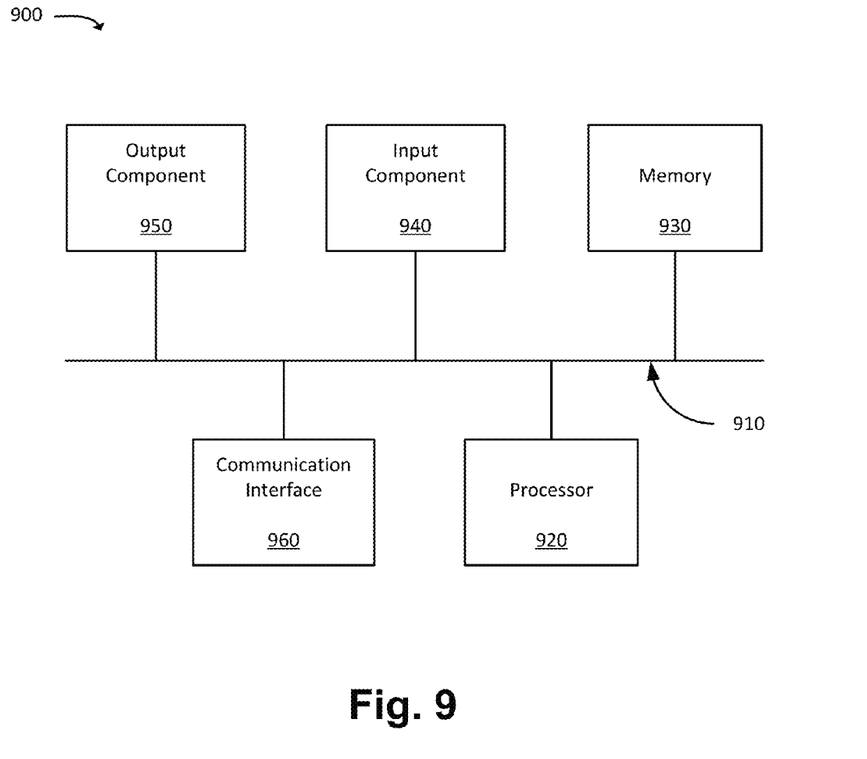
FIG. 9 is a diagram of example components of device.

FIG. 9 is a diagram of example components of device 900. One or more of the devices described above (e.g., with respect to a device illustrated in FIGS. 1A-1C, 2, 3, 7 and/or 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of operations have been described with regard to FIGS. 5 and 6, the order of the operations may be modified in other implementations. Further, non-dependent blocks may be performed in parallel.

Additionally, while an example of a data structures is illustrated in FIG. 4 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   detecting, by a mobile device, a wireless beacon that is in proximity to the mobile device, the detecting of the wireless beacon including receiving a beacon identifier that identifies the wireless beacon;
   querying, by the mobile device and based on the beacon identifier, a remote computing device for attribute information relating to the wireless beacon;
   receiving, by the mobile device and in response to the query, the attribute information from the remote computing device;
   determining, by the mobile device and based on the received attribute information, one or more actions to perform by the mobile device;
   performing, by the mobile device, the determined one or more actions.

2. The method of claim 1, wherein the determination of the one or more actions to perform by the mobile device are performed at an operating system or middleware layer of the mobile device.

3. The method of claim 1, wherein the one or more actions to perform include launching an application by the mobile device.

4. The method of claim 3, further comprising:
   automatically installing the application, before launching the application, when the application is not installed at the mobile device.

5. The method of claim 1, wherein the one or more actions to perform include providing a textual notification to a user of the mobile device.

6. The method of claim 1, wherein the attribute information includes:
   an indication of one or more applications that are associated with the wireless beacon;
   a location of the wireless beacon;
   an owner or operator associated with the wireless beacon; and
   security information associated with the wireless beacon.

7. The method of claim 1, wherein determining the one or more actions further includes:
   filtering the determined actions, based on preferences received from a user of the mobile device, to obtain a filtered version of the one or more actions; and
   wherein performing the determined one or more actions includes performing the filtered version of the one or more actions.

8. The method of claim 7, wherein the preferences include an indication of one or more owners or operators, of wireless beacons, and wherein filtering the determined actions further includes:
   determining the one or more actions to perform only when the one or more owners or operators, associated with the preferences, are also indicated in the attribute information for the wireless beacon.

9. The method of claim 1, wherein the beacon identifier includes a universally unique identifier (UUID) associated with the wireless beacon.

10. The method of claim 1, wherein the wireless beacon includes a Bluetooth Low Energy (BLE) wireless beacon.

11. A mobile device comprising:
    a hardware layer to:
       detect a wireless beacon that is in proximity to the mobile device, the detection of the wireless beacon including receiving a beacon identifier that identifies the wireless beacon; and
    a middleware or operating system layer to:
       query, based on the beacon identifier, a remote computing device for attribute information relating to the wireless beacon, receive, in response to the query, the attribute information from the remote computing device, determine, based on the received attribute information, an application to execute by the mobile device, and launch the determined application.

12. The mobile device of claim 11, wherein the application that is launched includes an application layer application.

13. The device of claim 11, further comprising:
automatically installing the application, before launching the application, when the application is not installed at the mobile device.

14. The device of claim 11, wherein the attribute information includes:
an indication of the application that is to be launched;
a location of the wireless beacon;
an owner or operator associated with the wireless beacon; and
security information associated with the wireless beacon.

15. The device of claim 11, wherein the middleware layer, when determining the application to execute, is further to:
determine to launch the application only when launching the application conforms to preference information of the user of the mobile device.

16. A method comprising:
detecting, by a mobile device, a wireless beacon that is in proximity to the mobile device, the detecting of the wireless beacon including receiving, via a short range wireless signal, a beacon identifier that identifies the wireless beacon;
querying, by the mobile device and based on the beacon identifier, a remote computing device for attribute information relating to the wireless beacon;
receiving, by the mobile device and in response to the query, the attribute information from the remote computing device;
determining, by the mobile device and based on the received attribute information, an application associated with the wireless beacon; and
launching, by the mobile device, the application when the application is not already executing at the mobile device.

17. The method of claim 16, wherein the wireless beacon includes a Bluetooth Low Energy (BLE) wireless beacon and wherein the remote computing device is queried via a wide area wireless network.

18. The method of claim 16, further comprising:
automatically installing the application, before launching the application, when the application is not installed at the mobile device.

19. The method of claim 16, wherein the attribute information includes:
an indication of the application that is associated with the wireless beacon;
a location of the wireless beacon;
an owner or operator associated with the wireless beacon; and
security information associated with the wireless beacon.

20. The method of claim 16, launching the application includes:
emitting an audio sound or vibrating the mobile device to alert a user of the mobile device of the launching of the application.

* * * * *